R. HARTWIG.
HEAT INSULATED RECEPTACLE.
APPLICATION FILED SEPT. 13, 1911.
1,033,771.
Patented July 23, 1912.
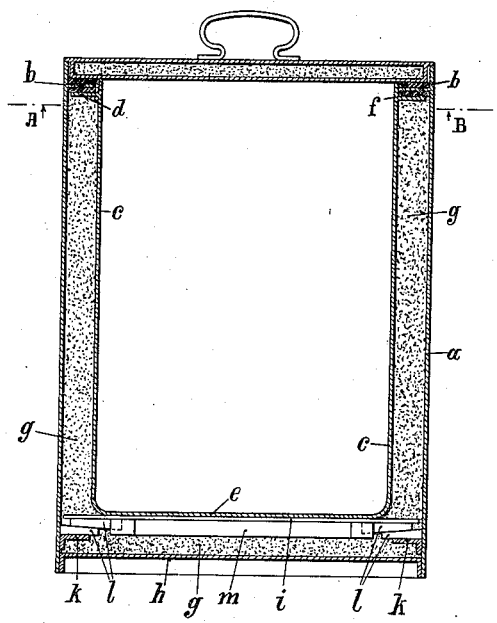
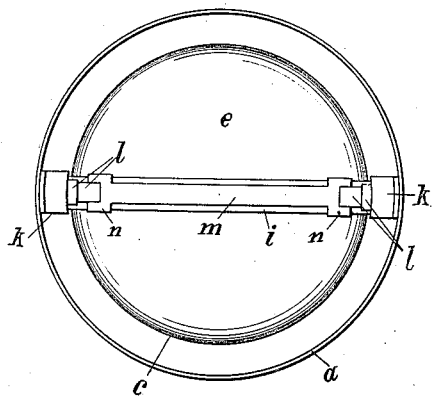
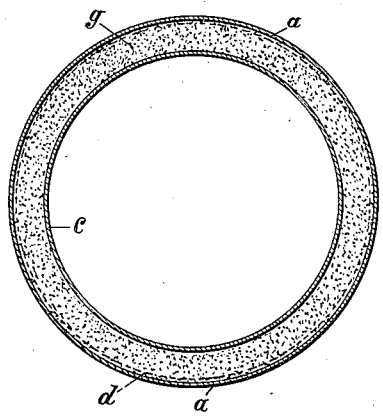
WITNESSES
INVENTOR
Robert Hartwig
BY
ATTORNEYS

UNITED STATES PATENT OFFICE.

ROBERT HARTWIG, OF BERLIN, GERMANY, ASSIGNOR TO THERMOS-AKTIENGESELL-SCHAFT, OF BERLIN, GERMANY.

HEAT-INSULATED RECEPTACLE.

1,033,771.  Specification of Letters Patent.  Patented July 23, 1912.

Original application filed June 29, 1911, Serial No. 635,971. Divided and this application filed September 13, 1911. Serial No. 649,072.

*To all whom it may concern:*

Be it known that I, ROBERT HARTWIG, a subject of the King of Prussia, residing at No. 12 Bregenzerstrasse, Berlin, Kingdom of Prussia, German Empire, have invented certain new and useful Improvements in Heat-Insulated Receptacles; and I do hereby declare the following to be a full, clear, and exact description of the same.

The present application is a division of my application, Serial No. 635,971, filed June 29, 1911 for Letters Patent of the United States of America.

This invention relates to heat insulated receptacles of the kind consisting of two vessels placed one in the other so as to form a jacket-space which is filled with a bad heat-conducting material. For the purpose of preventing heat from being transferred from one vessel to the other, an insulating ring or the like was placed between the two vessels at the place of transference that is, near the upper edge of the vessel.

My invention consists essentially in providing within the vessel a joint adapted to be sealed, and providing this joint with a tensioning device, comprising the insulating ring, near the upper edge of the receptacle and I prefer to arrange the tensioning device between the inner and outer bottoms of the receptacle.

Reference is to be had to the accompanying drawing forming a part of this specification in which—

Figure 1 is a vertical section of an embodiment of my invention; Fig. 2 is an underside view of the same, the outer bottom having been removed, and Fig. 3 is a transverse section on the line A—B of Fig. 1.

The improved receptacle consists substantially of the outer shell $a$ with the annular flange $b$, the inner receptacle $c$ with the annular flange $d$ and the bottom $e$. A rubber ring $f$ or the like is arranged between the two flanges. The space between the inner and outer receptacles is filled with ground cork $g$. Instead of the ground cork another insulating material might be employed, for instance asbestos or glass wool. A bottom $h$ is inserted into the outer shell $a$ and fastened therein by riveting, soldering or in any other manner.

Between the bottoms $e$ and $h$ a tensioning device is arranged for tightening the sealing joint between the shells $a$ and $c'$ near the upper edge of the receptacle. To this end a fillet $i$ is arranged below the inner bottom $e$, and wedges $l$ are driven between the fillet $i$ and the diametrically and oppositely arranged brackets $k$ fixed on the inner side of the outer shell $a$. In this way the tightening device, *i. e.*, the rubber ring $f$, is compressed between the flanges $b$, $d$. The wedges $l$ are secured by means of a fillet $m$ inserted between two diametrically opposite wedges so that they cannot shift. The ends $n$ of the fillet $m$ may be for instance forked so as to partly embrace the wedges. Instead of this fillet any other suitable means may be employed for securing the wedges. The remaining space between the bottoms $e$ and $h$ is filled with an insulating material $g$ in the same way as the space between the shells $a$ and $c'$.

Having now particularly described and ascertained the nature of my said invention and in what manner the same is to be performed, what I claim as my invention and desire to secure by United States Letters Patent is:

1. A heat insulated receptacle having an outer shell with an annular flange and an inner receptacle with an annular flange, a ring between the two flanges, heat insulating material in the space between the shell and inner receptacle, a tensioning device for tightening the ring between the flanges and heat insulating material surrounding the tensioning device, substantially as described.

2. A heat insulated receptacle having an outer shell with an annular flange and an inner receptacle with an annular flange, a ring between the two flanges, heat insulating material in the space between the shell and inner receptacle, brackets fixed on the shell, a tensioning device for tightening the ring between the flanges, a fillet supported on the brackets and heat insulating material surrounding the tensioning device, substantially as described.

3. A heat insulated receptacle having an outer shell with an annular flange and an inner receptacle with an annular flange, a ring between the two flanges, heat insulating material in the space between the shell and inner receptacle, brackets oppositely arranged and fixed on the shell and supporting a fillet, wedges between the brackets and fillet, substantially as described.

4. A heat insulated receptacle having an outer shell with an annular flange and an inner receptacle with an annular flange, a ring between the two flanges, heat insulating material in the space between the shell and inner receptacle, brackets oppositely arranged and fixed on the shell and supporting a fillet, wedges between the brackets and fillet and heat insulating material between the bottom of the shell and receptacle surrounding the tensioning device, substantially as described.

In testimony whereof, I have signed my name to this specification in the presence of two subscribing witnesses.

ROBERT HARTWIG.

Witnesses:
ALFRED DROTH,
WOLDEMAR HAUPT.